Patented Dec. 25, 1945

UNITED STATES PATENT OFFICE 2,391,462

PREPARATION OF A PHOSPHATIDE COMPOSITION

Percy L. Julian, Maywood, and Edwin W. Meyer, Evanston, Ill., assignors, by mesne assignments, to American Lecithin Company, Cleveland, Ohio, a corporation of Ohio No Drawing. Application July 25, 1941, Serial No. 403,990

8 Claims. (Cl. 252—1)

The present invention relates to phosphatides and particularly relates to a process for modifying some of the properties of phosphatides and mixtures containing phosphatides, and to the products produced thereby.

Phosphatides as commercially prepared from soybeans, corn oil, cottonseed oil, etc., are usually prepared containing some fat or oil in a minor proportion as a carrier for the phosphatides. The pure phosphatides have poor stability and the oil or fat acts as a stabilizer. The oils may either be the oils from which the phosphatide was obtained, or may be some other oil or fat such as cocoa butter. Soybean phosphatides as commercially prepared from the emulsion obtained by treating the oil with steam or water usually contain 55–65% phosphatides and about 35–45% oil. So called "cocoa butter lecithin" as commercially prepared usually contains around 20% cocoa butter.

The phosphatide-oil mixtures prepared are frequently of a solid or heavy consistency and frequently vary in consistency. Since the phosphatide mixtures are used almost exclusively in small amounts, in admixture with liquids and solids in which its effectiveness is dependent, to a considerable extent, upon its uniform incorporation, it is very desirable that a fluid material of uniform consistency be employed.

Also there are numerous uses of phosphatides, which are emulsifying agents, in which the emulsifying property is undesirable. Among these uses may be mentioned the use in lubricating oils, as a varnish inhibitor.

It is accordingly an object of this invention to provide a process for treating phosphatide and oil mixtures to control the viscosity.

A further object of this invention is to provide a process for treating phosphatides to destroy or lessen their emulsifying properties.

Another object is to provide a composition of phosphatides and oil having a lowered viscosity.

Another object is to provide phosphatides having decreased emulsifying properties.

Other objects will appear from the following description of the invention.

It has been found that the desired objects of the invention may be accomplished by treating an aqueous emulsion of a phosphatide-oil mixture with water soluble acids capable of reducing the pH value of the phosphatide. It has been found that by reducing the pH value of the phosphatide its solubility in the oil or fat is increased. However, in order to bring about this reduced pH value it is important that the acid be thoroughly distributed throughout the phosphatide mass. By adding a suitable water soluble acid to the emulsion, this lowering of the pH value is accomplished.

The amount of water soluble acids used may vary over a considerable range. For the increase in fluidity, increasing amounts up to a certain point appear to produce increasingly lowered viscosity. The change in emulsifying properties appears to be dependent upon the nature of the charge or charges upon the phosphatide molecule.

Compounds like phosphatides, of the lecithin variety, are "zwitter ions" and have long been recognized as good emulsifying agents since they contain a large oil soluble residue in the molecule as well as water soluble groupings. Thus the amino groups and the phosphoric acid groups have a tendency to be attracted to water, while the fatty acid portions would tend to be attracted to the oil. By treating the phosphatide with acids the charges upon the "zwitter ion" which tend to cause water solubility are neutralized with a resulting decrease in water solubility and increase in oil solubility. Since the effect of the water attracting groups has been nullified or minimized the tendency to emulsification is decreased.

As a consequence of the increased oil solubility of the phosphatide, the viscosity of the oil solution is decreased. Simultaneously, therefore, with the decreasing of the emulsifying properties a mixture of phosphatide and oil is more nearly a true solution than would be the case with the untreated phosphatide. Thus such a mixture would be of softer consistency.

It is important, however, that the acid be uniformly distributed throughout the phosphatide mass. Most water soluble acids, however, cannot ordinarily be distributed in the dry phosphatide mass. By treating an emulsion, however, the desired distribution can be obtained. The amount of acid added will depend somewhat upon the particular acid used, upon the particular viscosity desired, and upon the desired emulsifying properties. Using hydrochloric acid it has been found that there is little loss in emulsifying properties until a pH of about 4 is reached. At this point there is a sharp drop in the emulsifying property. Tests at pH values down to pH 1.8 still showed a marked decrease in emulsifying power of the phosphatide. While the emulsification did not substantially decrease until a pH of about 4 was reached, the decrease in viscosity of the dried emulsion was immediately noticeable upon a decrease of the pH value.

Generally any water soluble acid may be used such as mineral acids, including hydrochloric, sulfuric and phosphoric, glycerol phosphoric acid, and others which are capable of lowering the pH value of the phosphatide mass.

Hydrochloric acid was added in varying amounts to aliquot parts of a soybean oil-phosphatide emulsion containing about 50% water, about 32.5% phosphatides and about 17.5% oil.

The pH values of the acidified emulsions were obtained and the emulsions dried. The emulsifying properties of the mixture of phosphatide and oil were then determined by the Navy emulsion test, which is United States Government Test No. 320.12, as follows:

40 ml. of water and 40 ml. of lubricating oil containing 0.1% by weight of the oil of the phosphatide-oil acid mixture was added to a graduated cylinder. The cylinder was immersed in a heating liquid and a temperature of 180° F. maintained during the test. The mixture was agitated for 5 minutes, and allowed to stand at the test temperature for the specified time. The mixture separated into three layers, an oil layer, a water layer and an emulsion layer. The number of ml. in the emulsion layer was observed. Similar experiments were run using ammonium hydroxide to increase the pH value. The results are shown in the table.

Table

| pH values | Ml. of emulsion | | | |
|---|---|---|---|---|
| | 15 mins. | 30 mins. | 45 mins. | 60 mins. |
| 9.80 | 48.5 | 45.0 | 44.0 | 43.0 |
| 8.93 | 46.0 | 43.5 | 43.0 | 42.0 |
| 7.9 | 49.0 | 47.0 | 45.0 | 44.0 |
| 7.06 | 46.0 | 44.0 | 43.0 | 42.0 |
| 6.23 | 50.0 | 47.0 | 45.5 | 44.5 |
| 4.80 | 47.0 | 45.0 | 43.0 | 42.0 |
| 3.75 | 7.0 | 7.0 | 7.0 | 6.0 |
| 2.85 | 16.0 | 9.0 | 8.0 | 7.0 |
| 1.84 | 8.5 | 8.0 | 6.5 | 6.5 |

As previously indicated the addition of the acid in all cases resulted in a decrease in the viscosity from that of the untreated phosphatide, the optimum effect occurring at about a pH value of 4.0. However, there is no such sharp break in the viscosity reduction as in the reduction of the emulsifying property.

It is important, however, that the acid be uniformly distributed throughout the phosphatide mass. The amount of acid added will depend somewhat upon the particular composition of the phosphatide-oil mixture, upon the particular acid used, upon the particular viscosity desired, and upon the desired emulsifying properties. For the increase in fluidity increasing the amounts up to a certain point appears to produce increasingly lowered viscosity. The change in emulsifying properties appears to be dependent upon the nature of the charge or charges upon the phosphatide molecule. Thus while rather small amounts produce desired viscosities a substantial reduction in emulsifying power does not occur upon the addition of the smaller quantities but appears to take place only upon the addition of a sufficient amount of acid to produce the proper reduction of the pH value of the mixture. pH values determined on the water layer formed by emulsifying lubricating oil with water and employing the acid treated phosphatide-glyceride oil mixture indicate that the pH value at which substantial reduction in emulsifying begins generally lies in the range of pH 3.7 to 4.3 or approximately 4. Applicants, however, do not wish to be understood as meaning that the pH value of the water layer is necessarily or always a true indication of the pH value of the dry mixture itself or of the true condition of the charges upon the phosphatide molecule. The pH value obtained in the water layer may depend to some extent upon the amount of the particular acid dissolved in the water. However, the dry phosphatide-oil mixture is of a lipophillic nature and consequently the pH of an aqueous solution of an acid may not necessarily represent the true condition of the charges upon the phosphatide molecule. The decrease in the emulsifying properties, however, does occur rather sharply and may be readily determined. While the emulsifying properties do not substantially decrease until this critical point is reached more acid may be added if desired and still produce the lowered viscosity and decreased emulsifying properties.

It is not to be understood from the foregoing description that a mixture of oil and phosphatide must necessarily be treated or that the composition produced necessarily in all cases contains oil. A simple emulsion of phosphatide in water may be treated or the oil may be suitably removed from the treated mixture of oil and phosphatide, if desired. In such cases, the acid treated material will show lowered viscosity in oil solutions and where sufficient acid has been used will have decreased emulsifying power from that of untreated phosphatide. Oil-phosphatide mixtures, however, are generally preferred.

It is also to be understood that when oil-phosphatide mixtures are prepared the equivalent procedure of incorporating the acid in an oil emulsion and then mixing the oil-acid mixture, either with or without first drying the emulsion, with the phosphatide may be employed if desired.

Having described the invention what is claimed is:

1. The process which comprises treating a vegetable phosphatide composition selected from the group consisting of those consisting essentially of phosphatides and those consisting essentially of a major quantity of phosphatide and the balance of which consists of a fatty carrier, with water to form an emulsion, thoroughly incorporating a small amount of a water-soluble acid selected from the group consisting of mineral acids and glycerol phosphoric acid in said emulsion in amount sufficient to reduce the pH value to a value of about 4.0 to 1.8, separating the bulk of the water from the phosphatide composition and recovering the dried phosphatide composition.

2. The process of claim 1 in which the acid is a mineral acid.

3. The process of claim 1 in which the acid is glycerol phosphoric acid.

4. The process of claim 1 in which the acid is hydrochloric acid.

5. The process of decreasing the viscosity of a mixture consisting essentially of a major amount of phosphatide in a fatty carrier which comprises treating said composition with water to form an emulsion, thoroughly incorporating a small amount of a water-soluble acid selected from the group consisting of mineral acids and glycerol phosphoric acid in said emulsion in an amount sufficient to lower the pH value of the emulsion, but not below about 1.8, separating the bulk of the water from the resulting phosphatide-oil composition and recovering the dried phosphatide-oil composition.

6. The process of claim 5 in which the acid is a mineral acid.

7. The process of claim 5 in which the acid is glycerol phosphoric acid.

8. The process of claim 5 in which the acid is hydrochloric acid.

PERCY L. JULIAN.
EDWIN W. MEYER.